United States Patent [19]

Hattori et al.

[11] Patent Number: 5,696,767
[45] Date of Patent: Dec. 9, 1997

[54] BIT ERROR MEASURING APPARATUS

[75] Inventors: Atsushi Hattori; Hideaki Yatsuda, both of Hyogo, Japan

[73] Assignee: Hewlett-Packard Company, Palo Alto, Calif.

[21] Appl. No.: 524,945

[22] Filed: Sep. 7, 1995

[30] Foreign Application Priority Data

Sep. 14, 1994 [JP] Japan .................. 6-247166

[51] Int. Cl.$^6$ ............................................. G06F 11/00
[52] U.S. Cl. ........................ 371/5.1; 371/21.1; 371/67.1
[58] Field of Search ............................. 371/5.1, 21.1, 371/25.1, 67.1; 395/183.01, 183.18, 183.08, 183.09; 365/201

[56] References Cited

U.S. PATENT DOCUMENTS

| | | | |
|---|---|---|---|
| 3,576,541 | 4/1971 | Kwan et al. | 395/183.08 |
| 4,380,068 | 4/1983 | de Cauasnon | 371/24 |
| 5,200,960 | 4/1993 | Hamilton | 371/24 |
| 5,485,444 | 1/1996 | Kuhn et al. | 369/54 |

OTHER PUBLICATIONS

Bitalyzer 400 Bit Error Analyzer Users Guide—Synthesys Research Corp., Jul. 1994—pp. 64, 68.

*Primary Examiner*—Robert W. Beausoliel, Jr.
*Assistant Examiner*—Trinh L. Tu

[57] ABSTRACT

A system measures the positions of bit errors in digital recording devices and displays the physical locations of the bit errors and their distribution in such a manner that they can be grasped visually and intuitively. The system compares a data stream to be measured with a correct data stream and measures the bit errors. The apparatus includes a data stream memory which holds the correct data stream, a comparator, a counter which totals the number of bit errors, a measured bit number counter which totals the measured data stream and determines the boundaries of the logical recording blocks of the recording medium, an error number memory which holds the number of errors in each logical recording block, and an error address memory. The physical locations of bit errors are calculated on the basis of the measured and recorded bit error information for each logical block, and the bit error information is displayed on the physical form of the recording medium.

4 Claims, 5 Drawing Sheets

($\times 10^{-6}$)

($\times 10^{-6}$)

BIT ERROR MEASURING APPARATUS

FIELD OF THE INVENTION

This invention relates to a method for displaying information concerning errors in the reading of digitally-recorded data, such as a number of bit errors, bit error rate, etc. The method is performed by a bit error measuring apparatus which measures bit errors in bit streams from digital recording devices (abbreviated below as "recording devices") and digital recording media (abbreviated below as "recording media").

BACKGROUND OF THE ART

The display of bit error information in conventional bit error measuring apparatus is ordinarily performed by simply displaying bit error rates as numerical values, and by displaying a graph with a logical series of data being measured, such as data blocks, on the horizontal axis and the bit error rate on the vertical axis, as shown in FIG. 8.

Hereafter, the smallest unit of data which is treated as a single entity is referred to as a "block". Depending on the object of measurement and the purpose, zones, tracks, sectors, or blocks, etc., of the recording medium can correspond to blocks.

Important factors in evaluating disk recording media (abbreviated below as "disks") are non-uniformity, damage, distorted shape, etc. In evaluating these items, it is necessary to determine the physical positions of bit errors. Moreover, such evaluations are important not only for the recording media but also for the recording devices. This is because of the necessity for deriving a relative evaluation of the recording devices and the recording media.

In tape recording media (abbreviated below as "tape"), in addition to evaluating non-uniformity and damage, it is necessary to know how the tape and the head contact each other. Contact between the tape and the head is not uniform from the moment the tape touches the head until it separates from the head. Measuring changes in the bit error rate due to this non-uniformity is an important factor in evaluating the contact between the tape and the head. Further, information concerning physical locations of bit errors is indispensable.

Thus, it is extremely important to know the physical locations of bit errors and their distribution, for both disks, tapes and recording devices. In the prior art, it has been difficult to visually perceive the relationship between the distribution of bit error information and the actual physical locations of error regions on the recording media.

Accordingly, it is an object of the invention to provide apparatus for enabling the physical locations of bit error information to be grasped visually and intuitively.

SUMMARY OF THE INVENTION

A measuring apparatus is provided with a circuit for generating a correct data stream; a circuit for comparing an input data stream and the correct data stream and calculating the number of errors; a circuit for totaling the number of bits in the data stream being measured; and a circuit for totaling the number of errors in the bits being measured for each block. Processing of the results of the bit error measurement enables the bit error information to be displayed on a display screen of the measuring apparatus, superimposed on a diagram which models the shape of the actual recording medium. In the case of disks, the blocks in which bit errors occurred are shown as points on a diagram modeling the shape of the disk. In the case of tapes, the blocks in which bit errors occurred are shown as points on a diagram modeling the shape of the tape.

EXPLANATION OF SYMBOLS

Figure 1:
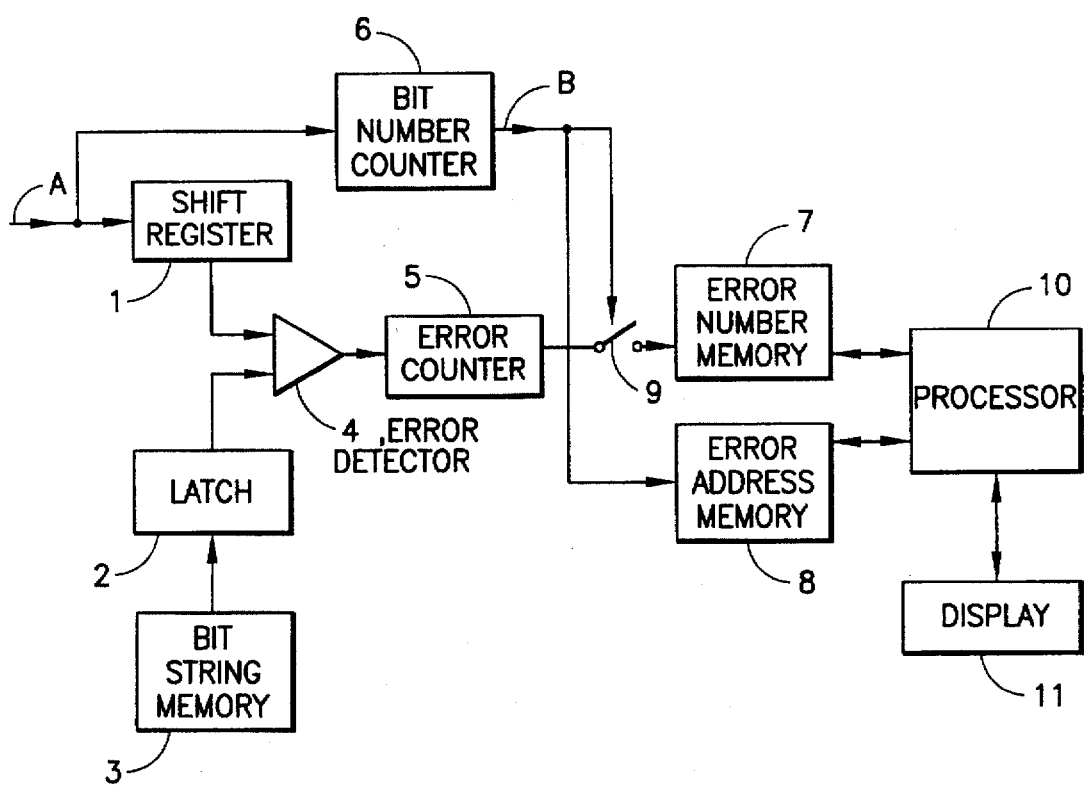
FIG. 1 is a block diagram of a preferred embodiment of the invention.

1: Shift register
2: Latch
3: Data stream memory
4: Error detector
5: Error number counter
6: Measured bit number counter
7: Error number memory
8: Error address memory
9: Switch
10: Processor
11: Display
A: Data stream to be measured
B: Block end signal

DETAILED DESCRIPTION OF THE INVENTION

Bit error measurements enable an investigation of the performance of recording devices and recording media. The physical location information of bit error events and the distribution of these locations can be grasped visually in relation to the physical shape of a recording medium, by displaying the measurement results in a form which models the physical shape of the actual recording medium. In such manner, it is possible to visualize physical locations of non-uniformity, damage, and distortions on a disk, as well as the state of contact between a tape and a transducer head.

Figure 9:
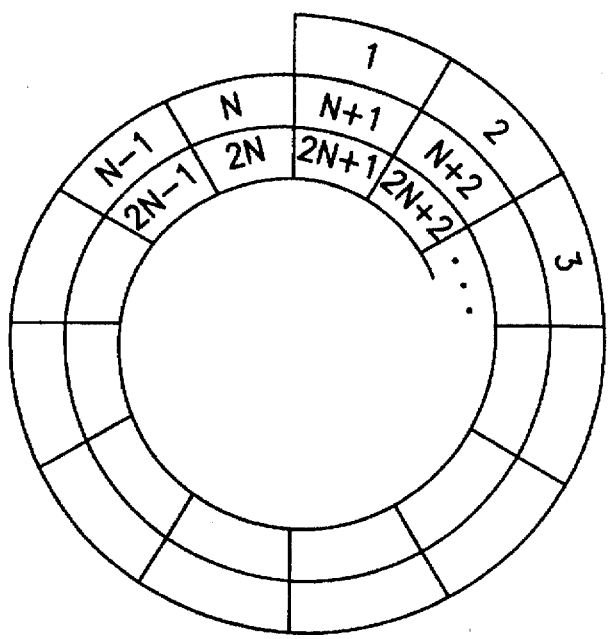
FIG. 9 is a diagram showing the relationship between block numbers and physical locations on a disk recording medium.

In the case of magneto-optical disks as shown in FIG. 9, if the relationship between the logical format and the physical format is given, the physical locations can be obtained uniquely from the block numbers and the locations of the data bytes in the blocks. If the number of blocks per track (one physical track) is known, the relative physical locations can be obtained, even when the starting point of the measurement is not at the beginning of the disk.

Figure 10:
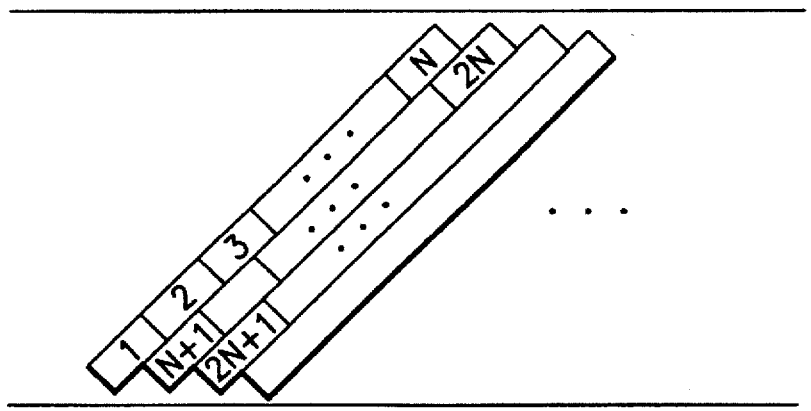
FIG. 10 is a diagram showing the relationship between the block numbers and physical locations on a tape recording medium.

Similarly, in the case of tapes, as shown in FIG. 10, if the number of blocks on one line is determined, the physical locations can be obtained from the logical location by calculation. In the case of tapes, however, it is difficult to obtain information concerning which line among the whole is involved. However, this information is not vital; therefore, the line on which the measurement started is considered to be the first line. If information concerning the logical locations of the bit errors is obtained, information concerning their physical locations can be obtained simply as described above. Therefore, if the bit error information is recorded together with the logical locations of the errors, the physical locations of the errors can be determined.

FIG. 1 is a block diagram of an embodiment of this invention. This figure shows an example of a means by which, when a bit error is detected, information about the logical location of the bit where the error occurred is recorded. A data stream A being measured undergoes serial-parallel conversion by means of a shift register 1 and is compared with data sent to a latch 2 from a data stream memory 3 which stores the correct data stream. An error detector 4 counts the number of disagreements between the two data streams and totals the number of disagreements counted, i.e., the number of errors in the data stream A, by means of an error counter 5.

A bit counter 6, which counts the number of bits in data stream A, generates a block end signal B when the number of input bits reaches the number of bits in one block. A switch 9 is closed by the block end signal; and the contents of error counter 5 are stored in error number memory 7. At the same time, an error recording address 8, which indicates a memory location in error number memory 7, is incremented. Error counter 5 is reset at this time, and begins to count the errors in the next block. A processor 10 controls the overall operation of the system and includes a display 11 for displaying the recording medium with superimposed indications of error bit patterns.

By the procedure described above, the numbers of errors for each block are accumulated in error number memory 7, and the addresses indicated by error recording addresses 8 correspond to the logical locations (block numbers). In this manner, information is accumulated concerning how many bit errors are contained in each block.

Data stream memory 3 has a smaller capacity than the quantity of data in the recording medium. Therefore, in order to measure the bit errors in the entire recording medium, an amount of data equal to the capacity of data stream memory 3 is repeatedly recorded on a recording medium, and these data are read and tested. That is, the same data are compared a number of times. This enables the number of blocks to be known in which the bit errors are located.

Switch 9 is shown in the figure in order to illustrate the flow of data in this invention in an easily-understood manner. Clearly, however, this invention is not limited to a mechanical switch in the position shown in the figure. Ordinarily, the data flow is controlled by processor 10. Further, the method for detecting errors has been described as performing a serial-parallel conversion of the data stream to be measured and combining and comparing a number of bits at a time. However, a method of comparing the data streams a bit at a time can also be performed. Also, the means for generating the correct data stream can be a pseudorandom signal generator.

Figure 2:
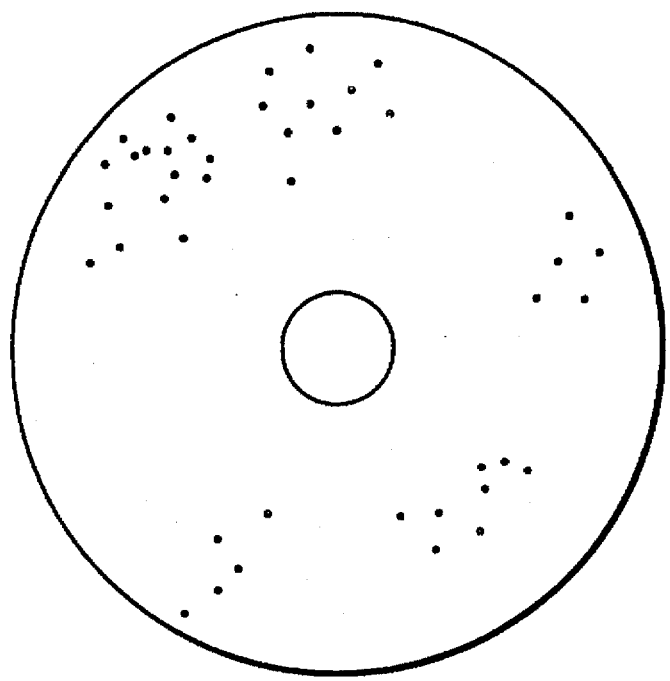
FIG. 2 is a diagram showing a display achieved by the invention of where blocks are recorded on a disk in which bit errors occurred.
Figure 3:
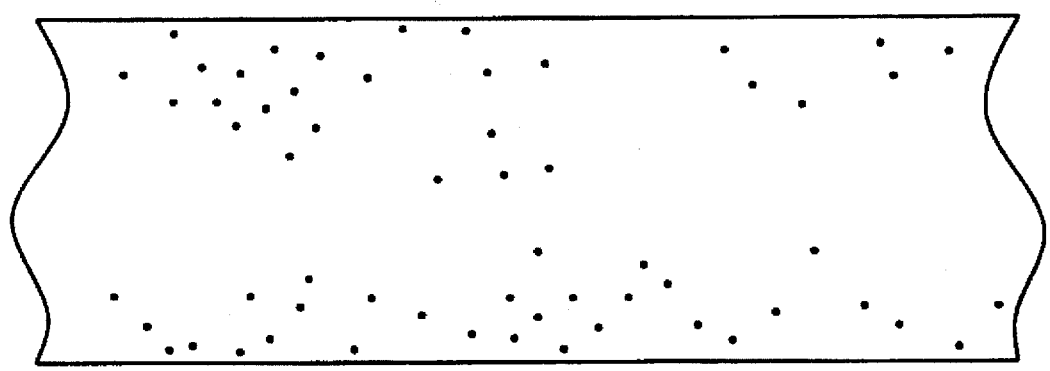
FIG. 3 is a diagram showing a display achieved by the invention of where blocks are recorded on a tape in which bit errors occurred.

Since the relationship between the logical format and the physical format is already known, physical location information is obtained by calculation from the logical location information of the bit errors. That is, since there is a unique correspondence between the location of each block and the physical location on the medium, the information concerning numbers of bit errors and the bit error rate at that location can be displayed. For example, if N blocks are contained in one track on the disk, or in one line on a tape, and if the numbers in error number memory 7 are displayed in the block locations shown in FIGS. 9 and 10 according to these addresses, the numerical displays can be made to correspond to the physical locations on the disk or tape, as the case may be. In this manner, the blocks in which the bit errors have occurred are displayed as shown in FIGS. 2 and 3, corresponding to a disk and a tape, respectively.

Figure 4:
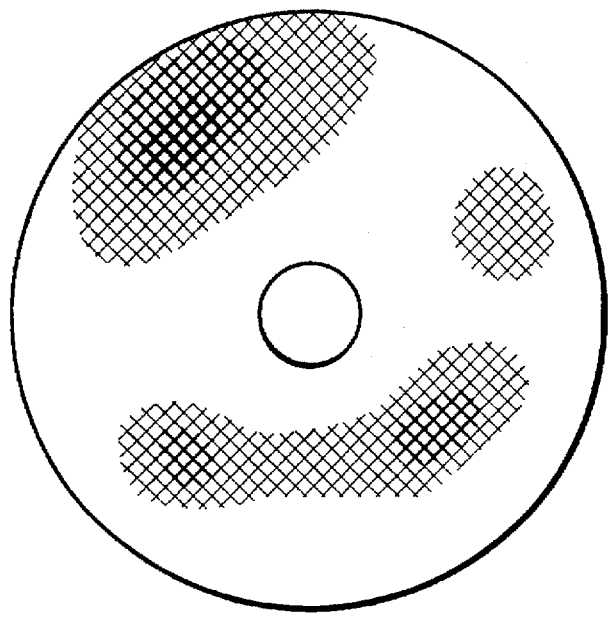
FIG. 4 is a diagram showing a display achieved by the invention of bit error rates on a disk recording medium using gray-scale or colors.
Figure 5:
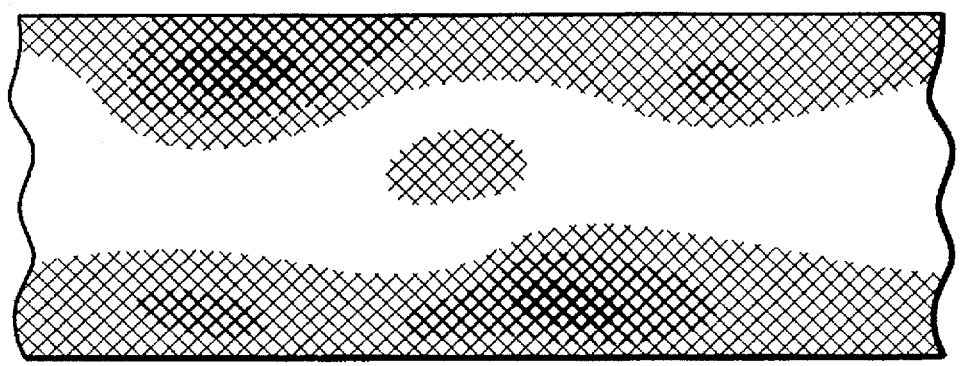
FIG. 5 is a diagram showing a display achieved by the invention of bit error rates on a tape recording medium using gray-scale or colors.
Figure 6:
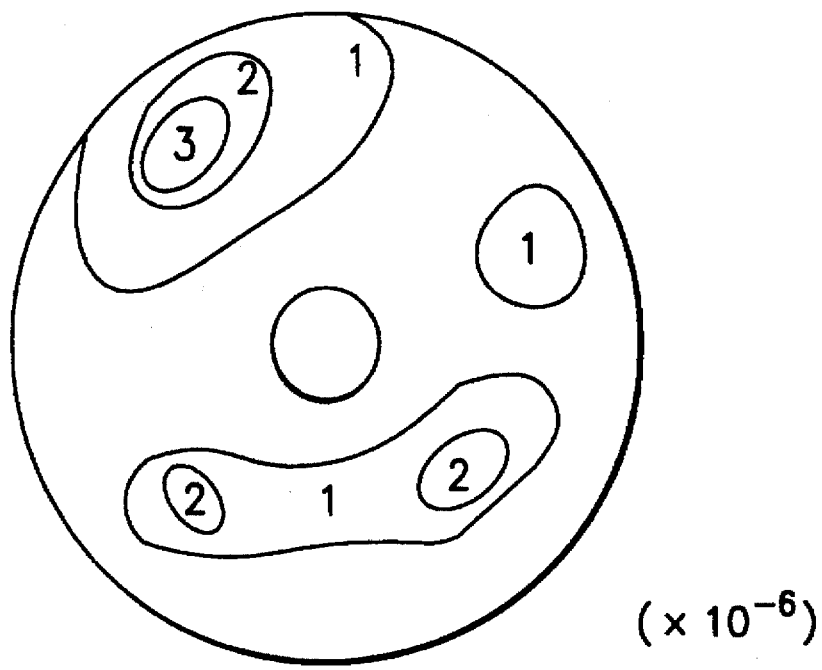
FIG. 6 is a diagram showing an example of a display achieved by the invention of bit error rates on a disk recording medium by use of contour lines.
Figure 7:
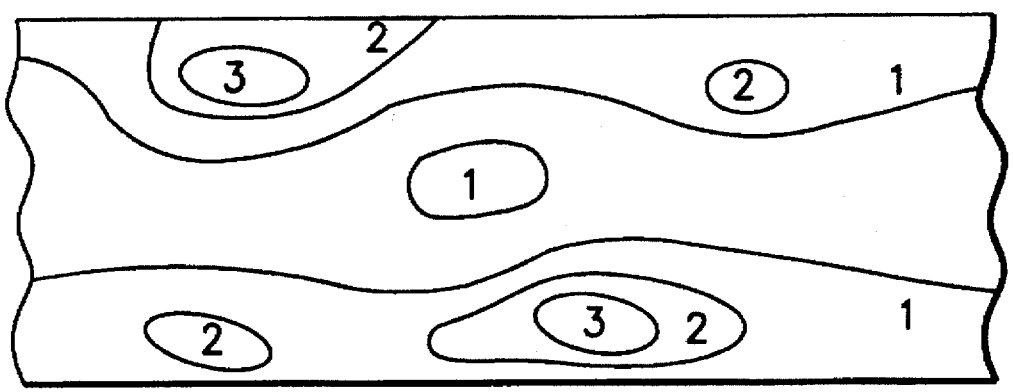
FIG. 7 is a diagram showing an example of a display achieved by the invention of bit error rates on a tape recording medium by use of contour lines.
Figure 8:
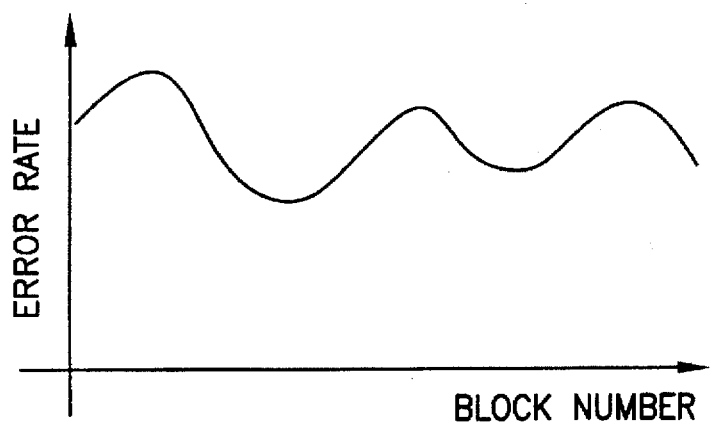
FIG. 8 is a diagram showing an example of the prior art wherein a plot of bit error rate versus block number is displayed.

From the number of bit errors obtained by using the means described above and the number of bits per block, the bit error rate is calculated, and is displayed by gray-scale or colors, as shown in FIGS. 4 and 5, corresponding to a disk and a tape, respectively. Moreover, the bit error rate obtained as described above can be displayed by map contour lines, as shown in FIGS. 6 and 7.

The above described invention enables the measuring of bit errors on digital recording media, such as disks and tapes, and their display in a form which models the physical shape of the actual recording medium. Thus, it becomes possible to grasp visually the physical distribution of the bit errors, correlated to the physical form of the recording medium. Thus, the efficiency of evaluating the performance of digital recording devices or media is raised.

Moreover, when one tries to perform real-time processing with the prior art technology, it is necessary to design the apparatus so that the bit error information is written at the transfer rate of the input data. In this invention, however, since the processing is performed in units of 8-bit bytes or integral numbers of this bit length, it is only necessary to design the apparatus so that the error information is written at a transfer rate of 1/(number of bits). This enables a more economical design.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims. Effectiveness of Invention:

What is claimed is:

1. Apparatus for measuring bit errors in a data stream of bits read from a digital recording medium, comprising:

means for generating a correct data stream;

comparison means responsive to said data stream and said correct data stream, for measuring and recording bit error information for each logical recording block read from said digital recording medium;

a display; and processor means coupled to said display and responsive to said bit error information for (i) correlating said bit error information to locations on said physical digital recording medium and (ii) for controlling the display to show the bit error information and to display the digital recording medium in a physical form and for further visually indicating physical locations on said displayed physical digital recording medium where the bit errors were generated and their distribution.

2. Apparatus for measuring bit errors as recited in claim 1, wherein said processor means causes the bit error information to be differentially displayed on said displayed physical digital recording medium in a form of varying grey scale or color data which correlates to said bit errors.

3. Apparatus for measuring bit errors as recited in claim 1, wherein said processor means causes the bit error information to be differentially displayed on said displayed physical digital recording medium in a form of contour lines which indicate areas of common bit error rates.

4. Apparatus for measuring bit errors as recited in claim 1, wherein numbers of bit errors are recorded for each logical recording block of said displayed physical digital recording medium by means of:

calculating means for outputting a block end signal when a number of bits in said data stream being measured reaches a determined number of bits;

said comparison means detecting bit errors by comparing bits in said data stream and the correct data stream and deriving a total number of errors between block end signals; and means for recording said total number of errors for each block end signal.

* * * * *